United States Patent
Castellani et al.

(10) Patent No.: US 10,766,828 B2
(45) Date of Patent: Sep. 8, 2020

(54) LIQUID FERTILIZER COMPOSITIONS COMPRISING NICKEL, COBALT, AND MOLYBDENUM, AND METHODS OF FORMING AND USING THE SAME

(71) Applicant: Produquímica Indústria e Comércio S.A., São Paulo (BR)

(72) Inventors: Michel Castellani, Suzano (BR); Ithamar Prada, São Paulo (BR)

(73) Assignee: Compass Minerals América do Sul Indústria e Comércio S.A., São Paulo (BR)

( * ) Notice: Subject to any disclaimer, the term of this patent is extended or adjusted under 35 U.S.C. 154(b) by 198 days.

(21) Appl. No.: 15/611,508

(22) Filed: Jun. 1, 2017

(65) Prior Publication Data

US 2018/0346389 A1    Dec. 6, 2018

(51) Int. Cl.
C05D 9/02    (2006.01)
C05G 5/23    (2020.01)

(52) U.S. Cl.
CPC .................... C05D 9/02 (2013.01); C05G 5/23 (2020.02)

(58) Field of Classification Search
CPC .............................. C05D 9/02; C05G 3/0076
See application file for complete search history.

(56) References Cited

U.S. PATENT DOCUMENTS

| | | | |
|---|---|---|---|
| 5,962,717 A | 10/1999 | Nonomura et al. | |
| 5,993,504 A | 11/1999 | Nonomura et al. | |
| 5,994,265 A | 11/1999 | Barclay et al. | |
| 5,997,600 A | 12/1999 | Dean | |
| 6,132,485 A | 10/2000 | Sanders | |
| 6,210,459 B1 | 4/2001 | Sanders | |
| 6,258,750 B1 | 7/2001 | Simpson et al. | |
| 6,391,079 B1 | 5/2002 | Takeda et al. | |
| 7,001,869 B2 | 2/2006 | Johnson | |
| 7,166,688 B1 | 1/2007 | Dean | |
| 7,410,522 B2 | 8/2008 | Green | |
| 7,445,657 B2 | 11/2008 | Green | |
| 7,666,242 B2 | 2/2010 | Gednalske et al. | |
| 8,002,870 B2 | 8/2011 | Yamashita | |

(Continued)

FOREIGN PATENT DOCUMENTS

BR    PI0804771-5    7/2009

OTHER PUBLICATIONS

Machine translation of BRPI0804771-5, retrieved Feb. 19, 2019 pp. 1-7.*

(Continued)

*Primary Examiner* — Jennifer A Smith
(74) *Attorney, Agent, or Firm* — Hovey Williams LLP

(57) ABSTRACT

Stable, liquid fertilizer compositions comprising nickel, cobalt, and molybdenum are provided herein. The fertilizer compositions are capable supplying high levels of micronutrients to seeds at low doses of the compositions. The compositions generally have low salinity and a pH from about 6.0 to about 8.0, thereby avoiding the high mortality rates of beneficial soil bacteria, which has been a major problem with prior seed fertilizers. Also provided herein are methods of forming and using the fertilizer compositions. Notably, it has been discovered that monoethanolamine molybdate solutions can be used to provide high levels of molybdenum to seed surfaces in a stable liquid formulation.

21 Claims, 3 Drawing Sheets

(56) References Cited

U.S. PATENT DOCUMENTS

| | | |
|---|---|---|
| 8,110,017 B2 | 2/2012 | Wells |
| 8,137,429 B2 | 3/2012 | Marks |
| 8,221,515 B2 | 7/2012 | Goodwin |
| 8,337,583 B2 | 12/2012 | Yamashita |
| 8,426,338 B2 | 4/2013 | McLaughlin et al. |
| 8,497,229 B2 | 7/2013 | van Boxtel-Verhoeven et al. |
| 8,506,670 B2 | 8/2013 | Varadachari |
| 8,523,975 B2 | 9/2013 | Ettlin et al. |
| 8,652,231 B2 | 2/2014 | Fuentes et al. |
| 8,685,133 B2 | 4/2014 | Ponder et al. |
| 8,845,774 B2 | 9/2014 | Yamashita |
| 9,017,443 B2 | 4/2015 | Varadachari |
| 9,017,444 B2 | 4/2015 | Liu et al. |
| 9,034,071 B2 | 5/2015 | Ponder et al. |
| 9,073,798 B1 | 7/2015 | Brooke |
| 9,150,461 B2 | 10/2015 | Mokhov et al. |
| 9,156,744 B2 | 10/2015 | Yamashita |
| 9,346,830 B2 | 5/2016 | Ramhold et al. |
| 9,540,291 B2 | 1/2017 | Wheeler |
| 9,554,502 B2 | 1/2017 | Madsen et al. |
| 2002/0129632 A1 | 9/2002 | Sheppardson et al. |
| 2003/0029211 A1 | 2/2003 | Sheppardson et al. |
| 2003/0073580 A1 | 4/2003 | Runkis |
| 2003/0101785 A1 | 6/2003 | Jia et al. |
| 2004/0067850 A1 | 4/2004 | Wahlberg |
| 2004/0206144 A1 | 10/2004 | Mitschker et al. |
| 2004/0250582 A1 | 12/2004 | Ambri |
| 2005/0065034 A1 | 3/2005 | Miele et al. |
| 2005/0247091 A1 * | 11/2005 | Gednalski ............... C05C 3/00 71/64.1 |
| 2007/0281858 A1 | 12/2007 | Wahlberg |
| 2008/0060402 A1 | 3/2008 | Mitschker et al. |
| 2008/0194407 A1 | 8/2008 | Ashmead et al. |
| 2009/0019905 A1 | 1/2009 | Savich et al. |
| 2009/0182044 A1 | 7/2009 | Ashmed et al. |
| 2009/0305888 A1 | 12/2009 | Li et al. |
| 2010/0137140 A1 | 6/2010 | Golub |
| 2010/0311583 A1 | 12/2010 | Laurent et al. |
| 2011/0052720 A1 | 3/2011 | Van Der Krieken et al. |
| 2012/0171130 A1 | 7/2012 | Kennedy |
| 2012/0255334 A1 | 10/2012 | Gans |
| 2013/0053245 A1 | 2/2013 | Golub et al. |
| 2013/0327103 A1 | 12/2013 | Chollet et al. |
| 2014/0011675 A1 | 1/2014 | Knochenmus et al. |
| 2014/0073599 A1 | 3/2014 | Cheung et al. |
| 2014/0113821 A1 | 4/2014 | Gu et al. |
| 2015/0007626 A1 | 1/2015 | Fanning et al. |
| 2015/0133298 A1 | 5/2015 | Nonomura |
| 2015/0299058 A1 | 10/2015 | Lamb et al. |
| 2015/0305251 A1 | 10/2015 | Eyres et al. |
| 2015/0376076 A1 | 12/2015 | Ward et al. |
| 2016/0000093 A1 | 1/2016 | Lamb et al. |
| 2016/0227783 A1 | 8/2016 | Brown et al. |
| 2016/0244377 A1 | 8/2016 | Hartmann |
| 2016/0244378 A1 | 8/2016 | Tyler et al. |
| 2016/0272549 A1 | 9/2016 | Varadachari |
| 2016/0297722 A1 | 10/2016 | Littmann |
| 2016/0347675 A1 | 12/2016 | Roach et al. |
| 2016/0366877 A1 | 12/2016 | Nicholas et al. |
| 2017/0008812 A1 | 1/2017 | Kim et al. |

OTHER PUBLICATIONS

Machine translation of abstract only (Portuguese and English included) of BRPI0804771-5, 2 pages.

* cited by examiner

LIQUID FERTILIZER COMPOSITIONS COMPRISING NICKEL, COBALT, AND MOLYBDENUM, AND METHODS OF FORMING AND USING THE SAME

BACKGROUND OF THE INVENTION

Field of the Invention

The present invention is generally directed to liquid fertilizer compositions particularly suited for application to seeds prior to germination.

Description of the Prior Art

Agricultural crops generally have a high nutritional demand for nitrogen, which is considered to be a primary macronutrient. Soy is a crop that exhibits a symbiotic relationship between the plant and the *Bradyrhizobium* bacterium, a microorganism that fixes nitrogen ($N_2$) from the air absorbed by plants by means of the enzymatic complex nitrogenase, converting the previously atmospheric nitrogen into assimilable nitrogen. In the interest of better plant development, specific fertilizers have been developed for application to seeds, enhancing the ability to convert atmospheric nitrogen into assimilable nitrogen. However, only some nutrients are relevant in this phase of plant growth, such as nickel, cobalt, and molybdenum. These elements have rather specific functions in plant development. Cobalt influences the absorption of nitrogen through its action on bacterial symbionts, increasing the activity of the bacteria by enhancing their ability to biologically fix the nitrogen in the soil. Nickel is an enzyme catalyst that promotes nitrogen fixation. Molybdenum is used by bacteria to produce nitrogenase, which is also the catalyst for the conversion of atmospheric nitrogen into assimilable nitrogen.

Among the questions most frequently asked by farmers is the compatibility of agrochemicals with inoculants at sowing time. Even more questions arise when it comes to pre-inoculated seeds. This is because one of the main factors limiting the success of biological nitrogen fixation (BNF) lies in the rapid death of *Bradyrhizobium* by fungicides, insecticides, micronutrients, and other agrochemicals used in the treatment of seeds. As an example, in the case of fungicides, high rates of mortality of *Bradyrhizobium* have been found, which reach 62% after just two hours and 95% after 24 hours of treatment with pesticides. Consequently, the compatibility of agrochemicals with inoculants is essential for the success of BNF.

The development of fertilizers for the treatment of seeds has always been a challenge due to the difficulty of achieving formulations with a high nickel, cobalt, and molybdenum content without the need for a large volume of applied product. Additionally, it has proven difficult to produce such a fertilizer having a pH between 6.0 and 7.5 and not affecting the development of beneficial bacteria. For example, one prior art fertilizer has been developed containing 10% molybdenum and 1% cobalt, and was extremely acidic with a pH around 1.5 to 2.5. This formulation contained phosphoric acid and cobalt sulfate, with the former element being responsible for forming a complex with the molybdenum, thereby reducing the pH due to the high quantity of acid. The latter element increased the salinity of the fertilizer, which upon coming into contact with bacteria, promoted denaturation and increased the mortality rate of the *rhizobia*. A second generation prior art fertilizer was able to increase the molybdenum and cobalt contents to 15% and 1.5%, respectively, but still suffered from the same problems. A third generation prior art fertilizer maintained high molybdenum and cobalt contents but substituted the source of cobalt with an ethylenediaminetetraacetic acid (EDTA) complex. While this source of cobalt did not increase the salinity of the fertilizer, the problem of acidity and of the salinity arising from the traditional sources of molybdenum still persisted, which also increased the mortality of the beneficial bacteria.

SUMMARY OF THE INVENTION

In one embodiment of the present invention, there is provided a liquid fertilizer composition comprising a source of nickel, a source of cobalt, and monoethanolamine molybdate. Methods of fertilizing seeds (pre-germination) comprise applying the liquid fertilizer composition to the surface of the seeds.

In another embodiment, there is provided a method of forming a liquid fertilizer. The method comprises adding a molybdenum-containing solution to water and agitating to form a homogenous mixture. The method further comprises adding a chelated cobalt compound and a chelated nickel compound to the homogenous mixture and agitating at least until the chelated cobalt compound and the chelated nickel compound are substantially dissolved in the homogenous mixture, thereby forming a liquid concentrate solution. Seaweed is then added to the liquid concentrate solution to form the liquid fertilizer.

In yet another embodiment, there is provided a method of fertilizing seeds comprising applying the liquid fertilizer composition to the surface of the seeds. The liquid fertilizer comprises monoethanolamine molybdate.

DETAILED DESCRIPTION OF THE PREFERRED EMBODIMENT

Figure 1:
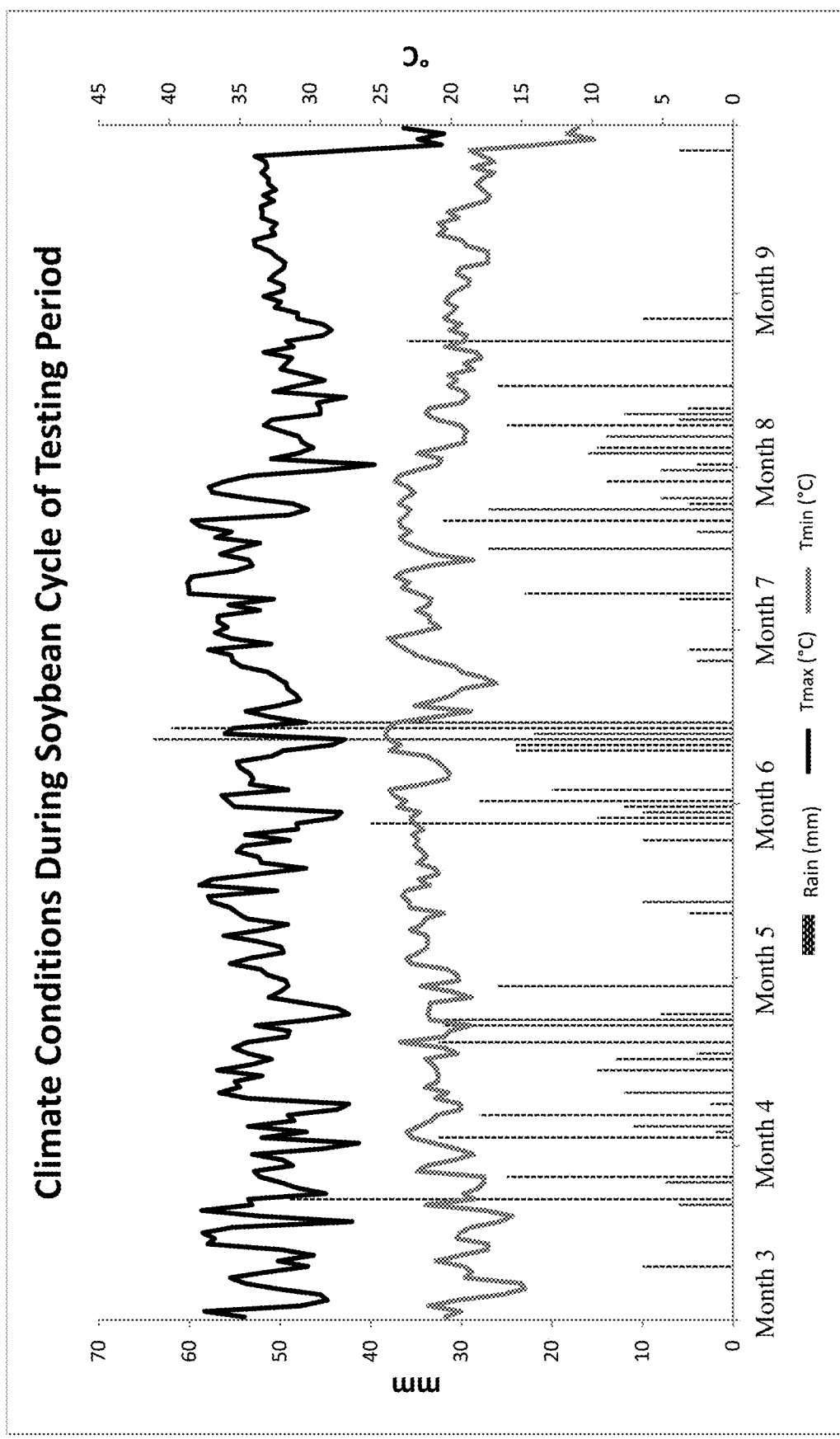
FIG. 1 is a graph showing the climate conditions during the development of the soybean crop during the experimental period.

Embodiments of the present invention are directed to liquid fertilizer compositions and methods of forming and using the same. The liquid fertilizer compositions comprise sources of key micronutrients for enhancing biological nitrogen fixation and may further comprise additional components containing natural molecules having a stimulant effect on the germination of seeds and on the regulation of plant growth. Advantageously, the liquid fertilizer compositions can be used with known seed inoculants without significantly hindering the effect of the inoculants. The liquid fertilizers provided herein supply a high concentration of nutrients with a low application dose compared to prior art fertilizers.

In one or more embodiments, the liquid fertilizer compositions comprises a source of nickel, a source of cobalt, and a source of molybdenum. The source of nickel is generally provided in the composition as a nickel salt or chelated nickel compound. For example, in certain embodiments the composition comprises nickel chelated with a chelating agent selected from the group consisting of ethylenediaminetetraacetic acid (EDTA), diethylenetriaminepentaacetic acid (DTPA), ethylenediamine-N,N'-bis(2-hydroxyphenylacetic acid) (EDDHA), amino acids, and mixtures thereof. Other chelating agents may also be used. In certain preferred embodiments, the chelating agent is EDTA. In certain preferred embodiments, the source of nickel is disodium nickel EDTA. The liquid fertilizer compositions in accordance with embodiments of the present invention generally comprise a source of nickel sufficient to provide a nickel content in the compositions of about 0.05% to about 5.0% by weight, preferably about 0.5% to about 1.5% by weight, and more preferably about 0.8% to about 1.0% by weight, with the total weight of the liquid fertilizer composition taken as 100% by weight.

The source of cobalt is generally provided in the composition as a cobalt salt or cobalt chelate. Similar to the source of nickel, the source of cobalt may comprise a chelated cobalt compound. For example, in certain embodiments the composition comprises cobalt chelated with a chelating agent selected from the group consisting of EDTA, DTPA, EDDHA, amino acids, and mixtures thereof. Other chelating agents may also be used. In certain preferred embodiments, the chelating agent is EDTA. In certain preferred embodiments, the source of cobalt is disodium cobalt EDTA. The liquid fertilizer compositions in accordance with embodiments of the present invention generally comprise a source of cobalt sufficient to provide a cobalt content in the compositions of about 0.02% to about 2.0% by weight, preferably about 0.2% to about 0.8% by weight, and more preferably about 0.4% to about 0.5% by weight, with the total weight of the liquid fertilizer composition taken as 100% by weight.

The source of molybdenum is generally provided in the composition as a molybdenum chelate. A variety of chelating agents can be used to complex the molybdenum in embodiments comprising a molybdenum chelate. In certain preferred embodiments, the composition comprises molybdenum chelated with monoethanolamine (MEA). The MEA molybdate chelate may be prepared from mixing molybdic acid and MEA in solution. While MEA molybdate has been used as a brake fluid in automobiles and used in other industrial applications, it has now been discovered that this compound can be used in liquid fertilizer formulations as a source of molybdenum for the treatment of seeds. Additionally, it has been discovered that stable, liquid fertilizer compositions can be formulated with MEA molybdate and additional sources of nutrients, such as nickel and cobalt, using the methods described herein. As used herein, the term "stable" refers to liquid compositions that remain substantially homogenously mixed without forming precipitates for at least 3 years after preparation. Prior to the present invention, such stable formulations having desirable levels of nickel, cobalt, and molybdenum have been difficult, if not impossible, to achieve. The liquid fertilizer compositions in accordance with embodiments of the present invention generally comprise a source of molybdenum sufficient to provide a molybdenum content in the compositions of about 1% to about 20% by weight, preferably about 5% to about 16% by weight, and more preferably about 8% to about 10% by weight, with the total weight of the liquid fertilizer composition taken as 100% by weight.

In certain embodiments, the fertilizer composition comprises an acid component. The acid component is preferably an organic acid, although inorganic (mineral) salts may also be used in some embodiments. In certain embodiments, the acid component is an organic acid selected from the group consisting of citric acid, ascorbic acid, acetic acid, oxalic acid, formic acid, propionic acid, butyric acid, valeric acid, caproic acid, lactic acid, malic acid, benzoic acid, carbonic acid, and mixtures thereof. In certain preferred embodiments, the organic acid is citric acid. When present, embodiments of the liquid fertilizer composition generally comprise from about 1% to about 10% by weight, preferably from about 2% to about 8% by weight, and more preferably from about 3% to about 5% by weight of the acid component, with the total weight of the liquid fertilizer composition taken as 100% by weight. The amount of acid used in the composition should be selected so as to avoid highly acidic formulations that negatively impact beneficial soil bacteria. Therefore, regardless the amount of acid present, the solution pH of the liquid fertilizer composition should generally be from about 6.0 to about 8.0, and preferably from about 6.5 to about 7.5.

In one or more embodiments, the fertilizer composition further comprises seaweed. As used herein, the term "seaweed" refers to any of several species of macroscopic, multicellular, marine algae. In certain embodiments, the seaweed is a species selected from the group consisting of *Ascophyllum nodosum, Corralina mediterranea, Jania rubens, Pterocladia pinnata, Cladophora dalmatica, Enteromorpha intestinalis, Ulva lactuca, Ecklonia maxima,* and *Saragassum* spp. The seaweed may also be provided as a mixture of more than one seaweed species. In particularly preferred embodiments, the seaweed is *Ascophyllum nodosum*. The seaweed is generally provided as a liquid concentrate suspension. For example, the seaweed can be provided at a concentration of about 40% to about 60% in water solution. The seaweed may also be provided as a diluted suspension. Regardless the embodiment, the liquid fertilizer composition generally comprises from about 5% to about 55% by weight, preferably from about 20% to about 45% by weight, and more preferably from about 30% to about 40% by weight of the seaweed, with the total weight of the liquid fertilizer composition taken as 100% by weight.

In one or more embodiments, the fertilizer composition further comprises an amino acid additive. In certain embodiments, the composition comprises an amino acid selected from the group consisting of tryptophan, glutamine, glycine, proline, lysine, and mixtures thereof. Other amino acids may also be used. In particularly preferred embodiments, the amino acid is tryptophan (e.g., L-tryptophan). Embodiments of the liquid fertilizer composition generally comprise from about 0.01% to about 1% by weight, preferably from about 0.02% to about 0.08% by weight, and more preferably from about 0.03% to about 0.05% by weight of an amino acid, with the total weight of the liquid fertilizer composition taken as 100% by weight.

Additional micronutrients, macronutrients, and/or other additives may also be present in the fertilizer compositions. For example, in certain embodiments, the compositions comprise a quantity of surfactant, anti-foaming (defoaming) agent, colorants agents, dispersing agents, and/or stabilizing agents. In certain preferred embodiments, the composition comprises a nonionic surfactant. When present, the surfactant is typically present in the composition at a level of about 0.1% to about 10% by weight, preferably about 0.5% to about 5% by weight, and more preferably about 1% to about 3% by weight, with the total weight of the liquid fertilizer composition taken as 100% by weight. In certain embodiments, the compositions further comprise an inoculant protective additive, particularly when the seeds are not intended to be planted soon after treatment and inoculation. Regardless, any additional micronutrients, macronutrients, or other additives should not significantly increase the salinity of the fertilizer composition. As would be understood in the art, the salinity of a liquid fertilizer composition can be presented as electrical conductivity. Therefore, in certain embodiments, the liquid fertilizer composition of the present invention, at 10% in water solution, has an electrical conductivity between about 10 and about 100 mS·cm$^{-1}$, preferably between about 20 and about 80 mS·cm$^{-1}$, and more preferably between about 30 and about 50 mS·cm$^{-1}$. The liquid fertilizer composition will generally have a density of about 1.25 g/mL to about 1.50 g/mL, preferably about 1.3 g/mL to about 1.45 g/mL, and more preferably about 1.35 g/mL to about 1.40 g/mL. The composition will generally have a viscosity of about 200 cps to about 1000 cps, preferably about 300 to about 800 cps, and more preferably about 400 to about 600 cps.

Methods of preparing stable, liquid fertilizer compositions comprising a source of nickel, a source of cobalt, and a source of molybdenum are also provided herein. In one or more embodiments, the methods comprise adding a molybdenum-containing solution to water and agitating to form a homogenous mixture. In certain embodiments, the molybdenum-containing solution is a molybdate salt solution. In certain preferred embodiments, the molybdenum-containing solution is an MEA molybdate (chelate) solution. The MEA molybdate solution can be prepared, for example, by adding a quantity of molybdic acid to heated water (e.g., water heated to about 60° C.) and subsequently adding MEA. The MEA should be added at a sufficiently slow rate so as to allow the MEA to chelate the molybdenum atom. Once the molybdenum-containing solution is sufficiently mixed, quantities of an organic acid and/or an amino acid can be added to the homogenous mixture and agitated until dissolved. Upon complete dissolution and mixing of any additional components, a source of cobalt and a source of nickel are added to the homogenous mixture and agitated until substantially dissolved to form a homogenous liquid concentrate solution. In preferred embodiments, the above-mentioned components are added under constant heat. At this stage, any further additives (surfactants, defoaming agents, etc.) can be added to the liquid concentration solution as desired. A separate solution comprising seaweed is then prepared, for example by diluting an extract concentrate and heating, and added to the liquid concentrate solution to form the liquid fertilizer composition.

In certain preferred embodiments, the liquid fertilizer compositions are provided as ready-to-use fertilizer compositions. As used herein, "ready-to-use" means that the liquid fertilizer compositions do not need to be diluted, for example with water, or mixed with other ingredients prior to application. However, it is within the scope of the present invention that the liquid fertilizer compositions are provided as concentrate or multi-part formulations, which require dilution and/or mixing with additional components prior to application. Regardless the embodiment, the liquid fertilizer composition generally comprises a total water content (i.e., including the water in the various component solutions and the water to which the component solutions are added) from about 10% to about 75% by weight, preferably from about 20% to about 60% by weight, and more preferably from about 25% to about 50% by weight, with the total weight of the liquid fertilizer composition taken as 100% by weight.

The liquid fertilizer compositions in accordance with embodiments of the present invention are particularly suitable for treatment of seeds prior to germination. Therefore, also provided herein are methods of fertilizing seeds comprising applying the liquid fertilizer composition to the surface of the seeds. A variety of seed types can be treated with the liquid fertilizer composition in accordance with embodiments of the present invention. A particularly preferred seed type is soybean seeds. However, other seed types can also realize the advantages of the present invention including, for example, pea, beans, and other legumes. The liquid fertilizer can be applied to the seeds using a variety of different application methods. For example, the liquid fertilizer may be sprayed on the seeds' surfaces, or the seeds and liquid fertilizer may be combined in a container and mixed to allow the fertilizer to contact the seeds' surfaces. The liquid fertilizer may be applied, for example, at the time of sowing or pre-inoculation. Advantageously, the liquid fertilizer compositions are compatible with a variety of beneficial soil bacteria and inoculants. As used herein, the term "compatible" means the application of a composition to seeds does not result in a statistically significant reduction in the bacteria or inoculant cell levels 2 hours after inoculation, as compared to seeds that are not treated with the composition.

It will be understood that the amount of liquid fertilizer applied to the seeds will depend on a number of factors, including seed type and the amount of micronutrients and/or additives present in the composition. However, in certain preferred embodiments, the liquid fertilizer composition is applied to the seeds at an amount of about 0.1 to about 10 mL of fertilizer per kg of seeds, preferably about 0.5 to about 8 mL of fertilizer per kg of seeds, and more preferably about 1 to about 4 mL of fertilizer per kg of seeds. Similarly, in certain embodiments, for example when the liquid fertilizer is applied to crop seeds, the fertilizer is applied to the seeds at an amount of about 10 to about 1000 mL of fertilizer per hectare, preferably about 40 to about 400 mL of fertilizer per hectare, and more preferably about 100 to about 200 mL of fertilizer per hectare.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods of producing formulations according to embodiments of the present invention and efficacy trials using these formulations. It is to be understood, however, that these examples are provided by way of illustration and nothing therein should be taken as a limitation upon the overall scope of the invention.

Example I

A first formulation was prepared in accordance with an embodiment of the present invention (Formulation A). Seaweed (Brandon XT48) is an extract solution having about 480 g/L of solids, and it was added to a reactor (reactor A). In another reactor (reactor B), the rest of the water (99.08 kg) was added, and the heating was activated. Molybdic acid (Produquimica, 50% Mo content, more preferably minimum 25% Mo content) was added to reactor B, keeping heating at 60° C. and stirring until homogenization. MEA (Oxiteno, Brazil, 99.2% minimum MEA content) was added to reactor B by slowly dosing. At this time, there was release of heat (exotherm). Stirring continued, and heating was kept at 60° C. until the solution was clear. Subsequently, tryptophan (ADT 30T) and anhydrous citric acid (Cargill, 99.5% minimum citric acid content) were added, stirring until complete dissolution. Next, nickel (Chelate Nickel-EDTA, 13.6% Ni, Produquimica) and cobalt chelate (Chelate Cobalt-EDTA, 13.6% Co, Produquimica) were added slowly, to avoid formation of lumps, while stirring and heating continued until complete dissolution. From this step, the heating can be turned off. Anti-foaming agent (SAG 1572) and surfactant (Atlox 2575) were then added, stirring until complete homogenization. The total mass was adjusted with water due to reduction by evaporation, thus finalizing the mixture B. The reactor B mixture was added to the extract seaweed from reactor A slowly, to avoid overflowing, because in there may be the formation of carbon dioxide, causing gas evolution to occur. The final composition of Formulation A is provided in Table 1.

TABLE 1

Formulation A. (Base of Calculation: 1000 L)

| Raw Materials | Content for Calculation (wt %) | Element contained | Quantity (kg) |
|---|---|---|---|
| Water | — | — | 320.3 |
| Molybdic acid | 50.0 | Mo | 241.2 |
| MEA | — | — | 114.6 |
| Tryptophan | — | — | 0.55 |
| Anhydrous Citric Acid | — | — | 53.6 |
| EDTA Dry Nickel Chelate | 13.7 | Ni | 88.0 |
| EDTA Dry Cobalt Chelate | 13.7 | Co | 44.0 |
| SAG 1572 Antifoam | — | — | 0.70 |
| Atlox AL2575 (surfactant) | — | — | 26.8 |
| Seaweed Extract | — | — | 450.25 |

Note:
The reactor B mixture should typically be mixed with the reactor A mixture within 2 days of being prepared, as the reactor B mixture does not have high stability.

Example II

In this experiment, Formulation A (described in Example I) was tested for compatibility with favorable microbial inoculants for $N_2$ biological fixation (NBF) on seeds.

1. Introduction

This report relates to an evaluation of a chemical fertilizer, Formulation A, with inoculants containing *Bradyrhizobium* strains for soybean cultivation, for sowing on the day or pre-sowing.

2. Equipment and Methods 2.1. Methodology for Analyzing Recovery of Rhizobacteria Cells in Soybean Seeds The methodologies used were based on MAPA [Ministry of Agriculture, Livestock and Supply] normative instructions. To evaluate the concentration and purity of inoculants, IN [normative instructions] No. 30 of 11/12/2010 (MAP 2010) was used. To evaluate the recovery of cells in soybean seeds, method 2 of IN No. 30 11/12/2010 (MAP 2010) was used.

2.2. Treatments 2.2.1. Formulations

Formulation A (described above) was evaluated.

2.2.2. Inoculants

Two commercially-available inoculants were used in this experiment.

Trial 1: RIZO-FORTE inoculant from Rizobacter (Inoculant I). Liquid peaty inoculant having a liquid inoculant with a certain percentage of peat. Inoculant with high concentration of cells, excellent quality, and good performance for application at the sowing time. The inoculant is composed of strains of *Bradyrhizobium japonicum* (SEMIA 5079) and *Bradyrhizobium diazoefficiens* (SEMIA 5080), with a guarantee of $5 \times 10^9$ cells/g. The inoculant was applied at a dose of 100 mL/50 kg of seeds, that is, 2 mL/kg of seed.

Trial 2: LASTRO inoculant from Total Biotechnology, LASTRO (Inoculant II). Peat inoculant with LASTRO additive, with excellent quality and performance for application at sowing time and also for pre-inoculation. The inoculant is composed of strains of *Bradyrhizobium elkanii* (SEMIA 587) and (SEMIA 5019), with a guarantee of $5.5 \times 10^9$ cells/g. A mixture of 300 mL of LASTRO additive+200 g of LASTRO inoculant was prepared, 9 mL/kg of seed being applied.

2.2.3. Treatments

Two trials were conducted. The treatments involved evaluating the two formulations in two trials. The first trial was with an inoculant with properties appropriate for use at sowing time and, therefore, with evaluation at time zero and at time 24 h after treatment of the seeds (Trial 1). The second trial was with an inoculant with properties appropriate for pre-inoculation to be accompanied by a protective additive, and assessment at time zero, 24 h and 360 h after treatment of seeds (Trial 2).

Trial 1
1) Control: Inoculant I (RIZO-FORTE)
2) Inoculant I+Formulation A
With 2 periods of analysis [time zero (2 h after treatment) and 24 h]

Trial 2
1) Control: Inoculant II (LASTRO)
2) Inoculant II+Formulation A
With 3 periods of analysis [time zero (2 h after treatment), 24 h and 360 h]

2.3. Preparation of Samples and Trial Conditions

The seeds were treated in the laboratory, drying for 15 minutes, and then applying inoculant. The seeds were stored in controlled conditions, with control of relative humidity to 60% (it is recommended that it not be below 45%) and temperature of 25° C.±2° C. (it is recommended that the temperature be between 20° C. and 30° C.).

2.4. Preparation of Dilutions and Plating

For each treatment, three subsamples, A, B and C, were removed, each containing 100 seeds and representing one repetition. One serial dilution was made of each repetition, and each dilution was plated in three repetitions.

The seeds were transferred to containers of the sterile flask type, with a capacity of 250 mL, containing 100 mL of saline solution of 0.85% NaCl, with three drops of Tween 80 solution (polyoxyethylene sorbitan monolaurate) (solution prepared at 2.5% w/v, adding 5.0 g of Tween 80 in 200 mL of distilled water), and shaken in an orbital shaker at 150 rpm for 15 min. This represents dilution $10^0$, that is, 1.

After shaking, 1 mL of dilution $10^0$ from each series was transferred to a sterile flask with 9 mL of sterile saline solution (0.85% NaCl), resulting in dilution $10^{-1}$. The operations were repeated until the desired dilution, depending on the expected concentration of cells. From each dilution, 0.1 mL was spread with the aid of a Drigalski spatula on Petri dishes containing YMA medium (Yeast-Manitol-Agar; modified by Vincent, 1970, also known as a medium 79) plus Congo red dye (CRYMA—Congo Red YMA), whose composition is specified in Table 3.

TABLE 3

Composition of the YMA medium used in plating *Bradyrhizobium*.

| Component | Quantity |
|---|---|
| Mannitol | 5 g |
| K$_2$HPO$_4$ | 0.5 g |
| MgSO$_4$·7H$_2$O | 0.2 g |
| NaCl | 0.1 g |
| Yeast extract | 0.4 g |
| Distilled water | 1,000 mL |
| Congo red solution (0.25 g in 100 mL of distilled water) | 10 mL |
| Agar | 10-15 g |
| pH adjusted to | 6.8-7.0 |

Since soybean seeds carry contaminating micro-organisms, the antimicrobials vancomycin and actidione were added to the YMA medium. The stock solution of vancomycin was prepared by the addition of 0.009 g of vancomycin in 3 mL of distilled water, followed by filtration through 0.2 μm sterile membrane. For preparation of the stock solutions of actidione, 25 mg of cycloheximide in 300 pL of ethyl alcohol were added, also followed by filtration through 0.2 sterile membrane. To each 300 mL of YMA medium with Congo red, sterilized and maintained at a temperature of approximately 45-50° C., were added 100 pL of vancomycin and 200 pL of actidione.

2.5. Counting of Colony-Forming Units

After spreading, the dishes were incubated at 28° C.±2° C. for seven days, when the colony-forming units (CFU) were counted, considering dilutions that allow counting 30 to 300 CFU. In the event none of the successive dilutions showed a mean count of 30 to 300 CFU, the mean count of the two dilutions closest to the suggested range was calculated. The CFU were calculated by the formula:

Number of seed cells$^{-1}$=$f \times N$, where:

f=dilution factor (given by the reciprocal of the dilution on the dish, multiplied by ten, since 0.1 mL was used for spreading on the dish); and N=mean number of colonies in the replications of the dishes in the selected dilution.

2.6. Statistical Analysis of Results

For analyses of recovery of cells on the seeds, the experimental design was entirely randomized with three repetitions. The results were submitted to analysis of variance (ANOVA). Next, the data were analyzed by Dunnett's test (bilateral), to evaluate the differences between the categories, taking as a comparison the inoculant of each trial without the addition of the formulation at time zero (2 h) and using a confidence interval of 95%. The treatments were also compared with the respective controls at time 24 h in Trial 1 and 360 h in Trial 2. Statistical analyses were performed using the Statistica Version 7 software.

3. Results

3.1. Analysis of Inoculants

The concentration and purity of the inoculants were evaluated according to the method of spreading (MAP, 2010), and it was found that inoculants were at least $1 \times 10^9$ cells g$^{-1}$ or mL$^{-1}$ and without the presence of contaminants in the dilution $10^{-5}$. RIZO-FORTE inoculant had a concentration slightly less than the guarantee ($5 \times 10^9$ cells/mL). Even so, the concentration was sufficient to ensure the success of the trial. The same was observed in relation to the LASTRO inoculant, which was less than what was specified in the guarantee ($5.5 \times 10^9$ cells/g). However, also for the LASTRO, the concentration was sufficient to ensure the success of the trial. Inoculant concentrations shown in Table 4.

TABLE 4

Colony-forming units (CFU) of *Bradyrhizobium* in the inoculants used in the experiment and the presence or absence of contaminants in dilution $10^0$.

| Inoculant | CFU/mL or g | Contaminant |
|---|---|---|
| RIZO-FORTE inoculant | $4.39 \times 10^9$ | zero |
| LASTRO inoculant | $3.53 \times 10^9$ | zero |

3.2. Recovery of Viable Cells in Seeds

In evaluating the treatments in this trial, the official protocol for recovery of cells in the seeds was followed (MAP, 2010), and at all other evaluation times all treatments were compared in relation to the treatment used as a control, which in Trial 1 was represented by the RIZO-FORTE inoculant at time 2 h, and in Trial 2 by LASTRO inoculant at time 2 h. An additional statistical analysis was performed, comparing the RIZO-FORTE inoculant with the formulation treatments at time 24 h and the LASTRO inoculant with the formulation treatments at time 360 h.

3.2.1. Trial 1

In Trial 1, performed in order to verify the compatibility of the formulations with inoculant intended for use at sowing time, it was found that Formulation A did not affect the recovery of cells in the seeds at time zero, that is, 2 h after treatment (Table 5). It should be emphasized that the recovery of cells in the seed was good. For example, 316,228 cells per seed with Formulation A, representing 26% of the theoretical calculation applied to the seeds, 1.2 million cells per seed.

However, 24 h after treatment of the seeds, there was a decrease in the number of cells recovered in the seeds in all treatments when compared to the control with inoculant at time zero (2 h) (Table 5). This shows that even the inoculant without adding a formulation was not able to maintain the number of cells for 24 h. However, when analyzing Formulation A in relation to the treatment only with inoculant, all at time 24 h, it was observed that Formulation A decreased the number of cells. Therefore, it was harmful to the survival of Bradyrhizobium at 24 h (Table 5).

TABLE 5

Recovery of Bradyrhizobium cells in soybean seeds (expressed in $\log_{10}$ of colony-forming units, UFC seed$^{-1}$), treated with RIZO-FORTE inoculant. In the first two columns, the results are compared with the control at time zero. In the third column, the results are compared with the control at time 24 hours.

|  | Time after inoculation | | |
| --- | --- | --- | --- |
| Treatments | zero (2 h) | 24 h | 24 h |
| RIZO-FORTE inoculant | 5.2 [1] | 4.5 *** | 4.5 [2] |
| RIZO-FORTE + Formulation A | 5.5 [ns] | 2.9 *** | 2.9 *** |

[1] Values represent the means of three repetitions, expressed in base 10 logarithm (for example, 6 indicates $10^6$ or 1,000,000 cells seed$^{-1}$). Means followed by *** indicates values significantly lower than the standard inoculant at 2 h by Dunnett's test (bilateral), with P ≤ 0.001; ns = not significant (P > 0.05).
[2] Means followed by *** indicates values significantly lower than the values significantly lower than the standard inoculant analyzed after 24 h by Dunnett's test (bilateral), with P ≤ 0.001.

3.2.2. Trial 2

In Trial 2, performed in order to verify the compatibility of the formulations with inoculant applied with a bacteria protective additive, which should ensure their survival for a longer time on the seeds, there was a very good recovery of cells on the seeds, which reached 630,957 cells per seed in the treatment with LASTRO (Table 6). There was no statistical difference for the treatment with Formulation A, either at time zero (2 h of treatment), or after 24 h (Table 6), indicating that the combination of inoculant and additive conferred, in fact, greater protection to the bacteria in comparison with the inoculant used in Trial 1 (Table 5). At time 360 h, however, all the treatments significantly differed from the control at time zero. Furthermore, Formulation A differed from the control at time 360 h, showing a harmful effect on the survival of Bradyrhizobium compared to the control at 360 h (Table 6).

TABLE 6

Recovery of Bradyrhizobium cells on soybean seeds (expressed in $\log_{10}$ of colony-forming units, UFC seed$^{-1}$) treated with LASTRO inoculant. In the first three columns, the results are compared with the control at time zero. In the fourth column, the results are compared with the control at time 360 h.

|  | Time after inoculation | | | |
| --- | --- | --- | --- | --- |
| Treatments | Zero (2 h) | 24 h | 360 h | 360 h |
| LASTRO inoculant | 5.81 [1] | 5.5 [ns] | 4.0 *** | 4.2 [2] |
| LASTRO + Formulation A | 5.7 [ns] | 5.4 [ns] | 3.3 *** | 3.3 *** |

[1] Values represent the means of three repetitions, expressed in base 10 logarithm (for example, 6 indicates $10^6$ or 1,000,000 cells seed$^{-1}$). Means followed by *** indicates values significantly lower than the standard inoculant at 2 h by Dunnett's test (bilateral), with P ≤ 0.001; ns = not significant (P > 0.05).
[2] Means followed by *** indicates values significantly lower than the values significantly lower than the standard inoculant analyzed after 350 h by Dunnett's test (bilateral), with P ≤ 0.001.

4. Conclusions

Considering the results of analyzing the recovery of Bradyrhizobium cells on soybean seeds, certain conclusions can be made. First, Formulation A did not affect the recovery of cells for either inoculant in the seeds at time zero (2 hours) after treatment. Second, it appears that with the inoculant intended for use in seeding, Formulation A was inferior to the control after 24 h. However, with the inoculant applied with a bacteria protective additive, Formulation A did not differ from the control at 24 h, but showed a statistically significant decrease after 360 h. Notably, when Formulation A is used in typical farming practice, the formulation is applied on the seeds, and the seeds are planted soon after. Therefore, the results about 2 hours after inoculation are most useful. If longer times are needed to preserve the inoculant strains, a protective additive may be used.

Example III

In this experiment, Formulation A was tested similar to Example II for compatibility with two other inoculants, Bacillus subtilis (RIZOS by Laboratório Farroupilha) and Trichoderma asperellum (QUALITY by Laboratorio Farroupilha). The Bacillus subtilis inoculant was applied to the seeds at a dose of 2 mL/kg of seeds. The Trichoderma asperellum inoculant was applied to the seeds at a dose of 2 g/kg of seeds. The seeds were then treated with Formulation A at a dose of 0.15 kg per 120 kg of seeds. The results showed that 2 hours after inoculation treatments with Formulation A are compatible when used with Bacillus subtilis and Trichoderma asperellum inoculants. That is, Formulation A did not cause a significant reduction in Bacillus subtilis and Trichoderma asperellum cells present in the seeds at 2 hours after treatment.

Example IV

This experiment evaluated plant nodulation and development and soybean crop yield using Formulation A.

Methodology

The experiment was conducted in a Cwa climate according to the Köppen classification system (altitude tropical climate with rain in summer and dry in winter). The soil was classified as typical dystrophic Red Latosol. Table 7 below shows the analytical results before setting up the experiment.

TABLE 7

Physical and chemistry analysis of soil, prior to corrections and setting up of the soybean experiments.

| Depth (cm) | pH CaCl$_2$ | M.O. g dm$^{-3}$ | P mg dm$^-$ | S | Ca | Mg | K | Al | H + Al mmol$_c$ dm$^{-3-}$ | Total | CTC | V % V % | Sat Al % m % |
|---|---|---|---|---|---|---|---|---|---|---|---|---|---|
| 0-10 | 5.7 | 27 | 31 | 11 | 45 | 9 | 2.1 | 1 | 25 | 55.9 | 80.8 | 69 | 2 |
| 10-20 | 4.6 | 22 | 13 | 42 | 30 | 6 | 1.0 | 1 | 50 | 37.5 | 87.8 | 43 | 1 |
| 20-40 | 4.3 | 19 | 9 | 89 | 17 | 5 | 0.7 | 8 | 62 | 22.0 | 84.1 | 26 | 27 |

| Depth (cm) | B | Cu | Fe mg dm$^{-3}$ | Mn | Zn | Clay | Silt | Sand |
|---|---|---|---|---|---|---|---|---|
| 0-10 | 0.36 | 3.6 | 20 | 2.8 | 2.2 | 50 | 21 | 29 |
| 10-20 | 0.37 | 1.6 | 17 | 1.4 | 0.7 | 50 | 22 | 28 |
| 20-40 | 0.40 | 0.9 | 15 | 1.7 | 0.4 | 52 | 20 | 27 |

Figure 2:
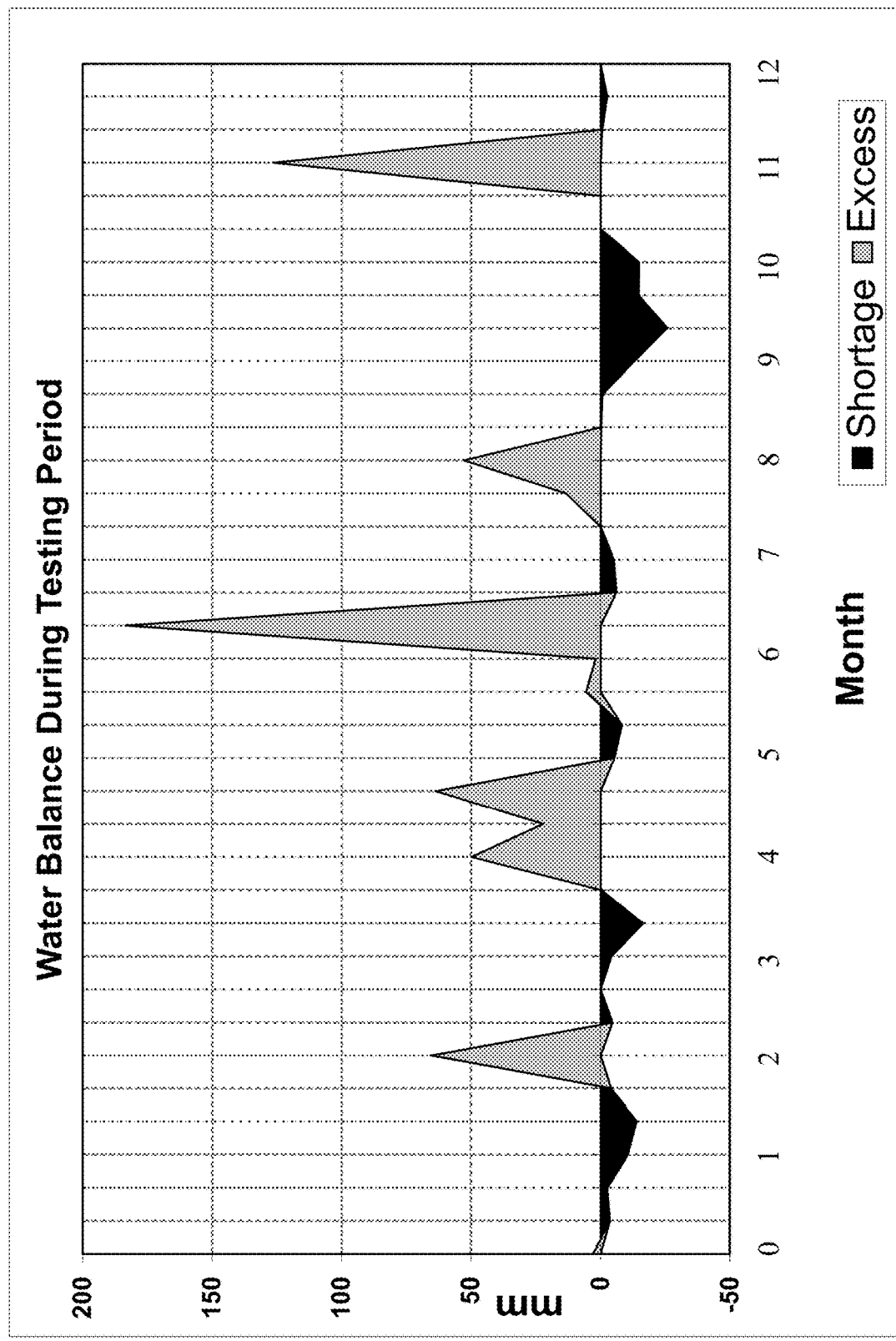
FIG. 2 is a graph showing the sequential water balance during the development of the soybean crop during the experimental period.

FIGS. 1 and 2 show, respectively, the climate conditions and the water balance during the development of the soybean crop during the testing period. Tables 8 and 9 below show, respectively, the characteristics of the planting of the soybean crop and a description of the treatments used for characterization of Formulation A. Formulation A was then tested against a dry product comprising 1.2% by weight cobalt, 2.4% by weight nickel, and 26% by weight molybdenum. The comparative dry product was mixed with Improver product (by Produquimica) containing 93% by weight of seaweed extract.

TABLE 8

Characteristics of the cultivar used and planting of the soybean crop.

| ITEM | DESCRIPTION |
|---|---|
| CROP | SOY BEANS |
| CULTIVAR | MONSOY 6410 IPRO |
| FINAL POPULATION | 400,000 plants/ha |
| SPACING | 0.50 m |
| PLANTING | Day 0 |
| EMERGENCE | Day 5 |
| HARVEST | Day 120 |
| MEAN CYCLE | 120 days |
| GENERAL MANAGEMENT | TS: 100 mL 100 kg$^{-1}$ Standak Top |
| | 200 ml Cruiser |
| | 100 ml Maxin XL |
| | Nitrogen base - 200 kg/ha Potenza P 10-49-00 |
| | Preplanting fertilization - 200 kg/ha KCl |

TABLE 9

Description of treatments.

| Treatment | Variety | PMS Setting | Consumption kg/ha | Dose (mL/kg) | Dose (mL/ha) | Time | Product |
|---|---|---|---|---|---|---|---|
| 1 | M 6410 IPRO | 94 | 46 | 0.0 | 0 | TS | Formulation A |
| 2 | M 6410 IPRO | 94 | 46 | 1.0 | 45 | TS | Formulation A |
| 3 | M 6410 IPRO | 94 | 46 | 2.0 | 90 | TS | Formulation A |
| 4 | M 6410 IPRO | 94 | 46 | 3.0 | 135 | TS | Formulation A |
| 5 | M 6410 IPRO | 94 | 46 | 4.0 | 180 | TS | Formulation A |
| 6 | M 6410 IPRO | 94 | 46 | 2.22 + 2.66 (g/kg) | 100 + 120 (g/ha) | TS | Dry Product + Improver |
| 7 | M 6410 IPRO | 149 | 73 | 0.0 | 0 | TS | Formulation A |
| 8 | M 6410 IPRO | 149 | 73 | 1.0 | 60 | TS | Formulation A |
| 9 | M 6410 IPRO | 149 | 73 | 2.0 | 120 | TS | Formulation A |
| 10 | M 6410 IPRO | 149 | 73 | 3.0 | 180 | TS | Formulation A |
| 11 | M 6410 IPRO | 149 | 73 | 4.0 | 240 | TS | Formulation A |
| 12 | M 6410 IPRO | 149 | 73 | 1.66 + 2.0 (g/kg) | 100 + 120 (g/ha) | TS | Dry Product + Improver |

The variables analyzed were:

Stand of plants and percentage of germination: 10 days after emergence, the plants in 2 rows×10 m in length were counted, with four replications. Germination was estimated according to the quantity of seeds deposited depending on the planting.

Number and dry mass of nodules: In phenological stage R1, 10 consecutive plants were collected in each experimental plot, wrapped in plastic buckets and their roots washed in running water. The number of nodules was counted there, and afterwards the nodules were put in an oven for 72 h at 60° C. to determine the weight.

Biometrics of plants: In phenological stage R6, 10 consecutive plants were collected in each experimental plot. The number of nodes per plant, number of branches/plants, number of pods per plant, and number of grains per plant were counted there.

Yield and weight of 100 grains: After picking by hand, the plants were threshed, the moisture content of the grain settling to 14%, for determining the yield in bags of 60 kg·ha$^{-1}$ and mass in grams of 100 grains.

Each treatment was composed of 12 rows×42 m in length, with 4 replications per treatment. The useful plot was formed by 2 rows×5 m in length. The seed treatments were performed on the day of planting, with the seeds and the products being inserted into a plastic bag and later shaken for 30 seconds to ensure that the products could adhere to the seeds. The data obtained were subjected to analysis of variance, and when there were significant differences between the means (F-test), these were compared by the Scott-Knott test, at the level of 10% probability.

Results

The tables and figures below present the results for germination percentage, number and weight of nodules per plant, number of pods, seeds, nodes and branches per plant, weight of 100 seeds (g) and yield in bags of 60 kg/ha. In Table 10, a better effect on germination can be seen, due to the increased size of the seed in larger doses of Formulation A. However, in sieve 5, Formulation A decreased germination at the largest dose.

TABLE 10

Percentage (%) of germination of plants in the soybean crop under different seed treatments.

| Product | Sieve 5 | | 6 | | Mean | |
|---|---|---|---|---|---|---|
| Control | 79.6 | Ac | 80.6 | Ac | 80.1 | c |
| Formulation A 1 ml/kg | 79.6 | Ac | 88.4 | Aa | 84.0 | b |
| Formulation A 2 ml/kg | 82.6 | Bb | 88.6 | Aa | 85.6 | b |
| Formulation A 3 ml/kg | 86.3 | Ba | 91.0 | Aa | 88.7 | a |
| Formulation A 4 ml/kg | 75.2 | Bd | 84.5 | Ab | 79.9 | c |
| Nicomo Dry + Improver | 82.7 | Ab | 85.9 | Ab | 84.3 | b |
| Mean | 81.3 | B | 87.7 | A | | |
| CV (%) | | | 3.39 | | | |

Means followed by the same capital letter on the line and small letter in the column do not differ by the Scott-Knott test at 10% probability.

The use of Formulation A in soybean seeds did not affect the number of nodules variable in the soybean, as can be observed in Table 11.

TABLE 11

Number of nodules per plant in soybean under different seed treatments.

| Product | Sieve 5 | | 6 | | Mean | |
|---|---|---|---|---|---|---|
| Control | 501 | Aa | 551 | Aa | 526 | a |
| Foimulation A 1 ml/kg | 623 | Aa | 530 | Aa | 576 | a |
| Formulation A 2 ml/kg | 629 | Aa | 526 | Aa | 578 | a |
| Formulation A 3 ml/kg | 589 | Aa | 445 | Aa | 517 | a |
| Formulation A 4 ml/kg | 541 | Aa | 459 | Aa | 500 | a |
| Nicomo Dry + Improver | 505 | Aa | 448 | Aa | 476 | a |
| Mean | 577 | A | 482 | B | | |
| CV (%) | | | 22.03 | | | |

Means followed by the same capital letter on the line and small letter in the column do not differ by the Scott-Knott test at 10% probability.

The weight of nodules showed a tendency to decrease with increasing size of the soybean seeds and was only positively influenced at the smallest dose of Formulation A (Table 12).

TABLE 12

Weight (g) of nodules per plant in soybean under different seed treatments.

| Product | Sieve 5 | | 6 | | Mean | |
|---|---|---|---|---|---|---|
| Control | 1.93 | Ab | 1.82 | Ab | 1.87 | b |
| Formulation A 1 ml/kg | 2.36 | Aa | 2.17 | Aa | 2.27 | a |
| Formulation A 2 ml/kg | 2.03 | Ab | 1.63 | Bb | 1.83 | b |
| Formulation A 3 ml/kg | 2.12 | Ab | 1.76 | Bb | 1.94 | b |
| Formulation A 4 ml/kg | 2.11 | Ab | 1.90 | Ab | 2.01 | b |
| Nicomo Dry + Improver | 1.93 | Ab | 1.94 | Ab | 1.93 | b |
| Mean | 2.11 | A | 1.88 | B | | |
| CV (%) | | | 10.52 | | | |

Means followed by the same capital letter on the line and small letter in the column do not differ by the Scott-Knott test at 10% probability.

The number of pods showed a significant difference between the sieves, with sieve 6 showing the lowest values. The largest dose of Formulation A substantially impaired the number of pods, regardless of the sieve studied (Table 13).

TABLE 13

Number of pods per plant in soybean under different seed treatments.

| Product | Sieve 5 | | 6 | | Mean | |
|---|---|---|---|---|---|---|
| Control | 48.1 | Aa | 33.7 | Ba | 40.9 | a |
| Formulation A 1 ml/kg | 45.0 | Aa | 35.8 | Ba | 40.4 | a |
| Formulation A 2 ml/kg | 52.3 | Aa | 34.9 | Ba | 43.6 | a |
| Formulation A 3 ml/kg | 52.0 | Aa | 34.3 | Ba | 43.1 | a |
| Formulation A 4 ml/kg | 29.6 | Ab | 30.9 | Aa | 30.2 | b |
| Nicomo Dry + Improver | 49.5 | Aa | 35.7 | Ba | 42.6 | a |
| Mean | 45.7 | A | 34.3 | B | | |
| CV (%) | | | 14.50 | | | |

Means followed by the same capital letter on the line and small letter in the column do not differ by the Scott-Knott test at 10% probability.

In Table 14, a similar behavior can be seen between the number of pods and seeds in soybean plants.

TABLE 14

Number of seeds per plant in soybean under different seed treatments.

| Product | Sieve | | | | Mean | |
|---|---|---|---|---|---|---|
| | 5 | | 6 | | | |
| Control | 129.2 | Aa | 91.9 | Ba | 110.5 | a |
| Formulation A 1 ml/kg | 103.7 | Ab | 89.3 | Aa | 96.5 | a |
| Formulation A 2 ml/kg | 130.9 | Aa | 81.4 | Ba | 106.1 | a |
| Formulation A 3 ml/kg | 135.2 | Aa | 87.1 | Ba | 111.1 | a |
| Formulation A 4 ml/kg | 73.5 | Ac | 77.9 | Aa | 75.7 | b |
| Nicomo Dry + Improver | 129.3 | Aa | 90.7 | Ba | 110.0 | a |
| Mean | 114.5 | A | 85.3 | B | | |
| CV (%) | | | 14.68 | | | |

Means followed by the same capital letter on the line and small letter in the column do not differ by the Scott-Knott test at 10% probability.

For the number of nodes variable, the treatment that stood out the least was the largest dose of Formula A applied to the smallest seed size (Table 15).

TABLE 15

Number of nodes per plant in soybean under different seed treatments.

| Product | Sieve | | | | Mean | |
|---|---|---|---|---|---|---|
| | 5 | | 6 | | | |
| Control | 18.3 | Aa | 16.4 | Ba | 17.3 | a |
| Formulation A 1 ml/kg | 17.5 | Aa | 16.6 | Aa | 17.0 | a |
| Formulation A 2 ml/kg | 18.7 | Aa | 16.3 | Ba | 17.5 | a |
| Formulation A 3 ml/kg | 18.1 | Aa | 16.5 | Ba | 17.3 | a |
| Formulation A 4 ml/kg | 15.5 | Ab | 16.3 | Aa | 15.9 | b |
| Nicomo Dry + Improver | 18.0 | Aa | 16.3 | Ba | 17.1 | a |
| Mean | 17.5 | A | 16.4 | B | | |
| CV (%) | | | 4.62 | | | |

Means followed by the same capital letter on the line and small letter in the column do not differ by the Scott-Knott test at 10% probability.

The number of branches showed a positive correlation between the application of Formulation A and seeds of smaller size, except for the largest dose (Table 16).

TABLE 16

Number of branches per plant in soybean under different seed treatments.

| Product | Sieve | | | | Mean | |
|---|---|---|---|---|---|---|
| | 5 | | 6 | | | |
| Control | 1.7 | Ab | 1.8 | Ab | 1.7 | b |
| Formulation A 1 ml/kg | 3.1 | Aa | 1.8 | Bb | 2.4 | a |
| Formulation A 2 ml/kg | 3.1 | Aa | 2.1 | Ba | 2.6 | a |
| Formulation A 3 ml/kg | 3.3 | Aa | 2.4 | Ba | 2.8 | a |
| Formulation A 4 ml/kg | 1.7 | Ab | 1.8 | Ab | 1.8 | b |
| Nicomo Dry + Improver | 2.8 | Aa | 2.6 | Aa | 2.7 | a |
| Mean | 2.8 | A | 2.1 | B | | |
| CV (%) | | | 18.92 | | | |

Means followed by the same capital letter on the line and small letter in the column do not differ by the Scott-Knott test at 10% probability.

Regardless of the formulation used in seed treatment, it was possible to observe positive influence with increasing weight of the seeds (Table 17).

TABLE 17

Weight of 100 seeds (g) in the soybean crop under different seed treatments.

| Product | Sieve | | | | Mean | |
|---|---|---|---|---|---|---|
| | 5 | | 6 | | | |
| Control | 12.6 | Bc | 15.4 | Ac | 14.0 | c |
| Formulation A 1 ml/kg | 15.8 | Ba | 16.9 | Aa | 16.3 | a |
| Formulation A 2 ml/kg | 15.3 | Bb | 16.4 | Ab | 15.8 | b |
| Formulation A 3 ml/kg | 15.7 | Ba | 16.5 | Ab | 16.1 | a |
| Formulation A 4 ml/kg | 15.6 | Ba | 16.3 | Ab | 15.9 | b |
| Nicomo Dry + Improver | 15.8 | Aa | 15.4 | Bc | 15.6 | b |
| Mean | 15.6 | B | 16.3 | A | | |
| CV (%) | | | 2.06 | | | |

Means followed by the same capital letter on the line and small letter in the column do not differ by the Scott-Knott test at 10% probability.

With the results shown in Table 18, even without significant differences, there was an increase of yield in the soybean crop in the order of 4 to 14% with the use of Formulation A. The combination of Formulation A and larger sizes of seeds provided the best yields for soybeans.

TABLE 18

Yield (bags of 60 kg/ha) in the soybean crop under different seed treatments.

| Product | Sieve | | | | Mean | |
|---|---|---|---|---|---|---|
| | 5 | | 6 | | | |
| Control | 72.1 | Aa | 75.9 | Aa | 74.0 | a |
| Formulation A 1 ml/kg | 75.3 | Aa | 86.9 | Aa | 81.1 | a |
| Formulation A 2 ml/kg | 76.9 | Aa | 82.1 | Aa | 79.5 | a |
| Formulation A 3 ml/kg | 80.6 | Aa | 82.0 | Aa | 81.3 | a |
| Formulation A 4 ml/kg | 78.6 | Aa | 76.4 | Aa | 77.5 | a |
| Nicomo Dry + Improver | 89.7 | Aa | 82.4 | Aa | 86.1 | a |
| Mean | 80.2 | A | 82.0 | A | | |
| CV (%) | | | 12.78 | | | |

Means followed by the same capital letter on the line and small letter in the column do not differ by the Scott-Knott test at 10% probability.

CONCLUSION

Figure 3:
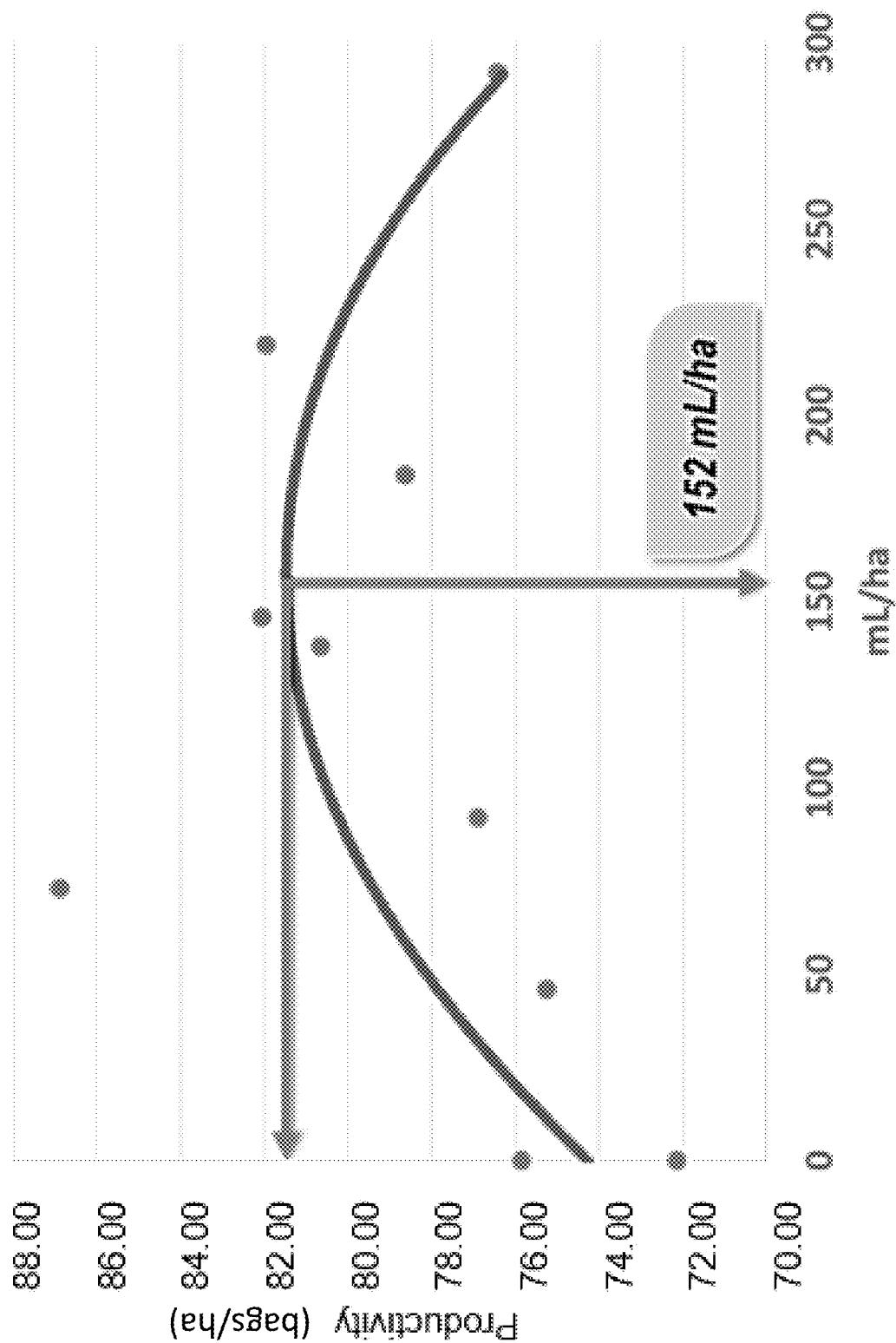
FIG. 3 is a graph showing the yield (bags 60 kg/ha) in the soybean crop under different seed treatment doses.

Under the development conditions of the experiment, certain conclusions can be made. For example, it appears the dose of Formulation A recommended for a soybean crop should be adjusted to about 150 ml/ha (See, FIG. 3). Additionally, Formulation A does not appear to interfere in the process of establishing symbiosis between soybean plants and nitrogen bacteria. Finally, it appears that the use of Formulation A contributes to an increase in grain weight.

The invention claimed is:

1. A liquid fertilizer composition comprising a source of nickel, a source of cobalt, and monoethanolamine molybdate, said liquid fertilizer composition having a solution pH of about 6.0 to 7.5.

2. The liquid fertilizer composition of claim 1, wherein said source of nickel is a chelated nickel compound.

3. The liquid fertilizer composition of claim 2, wherein said chelated nickel compound is an ethylenediaminetetraacetic acid nickel chelate compound.

4. The liquid fertilizer of claim 1, wherein said source of cobalt is a chelated cobalt compound.

5. The liquid fertilizer composition of claim 4, wherein said chelated cobalt compound is an ethylenediaminetetraacetic acid cobalt chelate compound.

6. The liquid fertilizer composition of claim 1, further comprising an organic acid.

7. The liquid fertilizer composition of claim 6, said fertilizer comprising from about 1% to about 10% by weight of said organic acid.

8. The liquid fertilizer composition of claim 7, wherein said organic acid is citric acid.

9. The liquid fertilizer composition of claim 1, said fertilizer comprising a nickel content of about 0.2% to about 2.0% by weight.

10. The liquid fertilizer composition of claim 1, said fertilizer comprising a cobalt content of about 0.1% to about 1.0% by weight.

11. The liquid fertilizer composition of claim 1, said fertilizer comprising a molybdenum content of about 1% to about 20% by weight.

12. The liquid fertilizer composition of claim 1, further comprising seaweed.

13. The liquid fertilizer composition of claim 12, said fertilizer comprising from about 10% to about 55% by weight of said seaweed.

14. The liquid fertilizer composition of claim 1, further comprising an amino acid.

15. The liquid fertilizer composition of claim 14, wherein said amino acid is tryptophan.

16. The liquid fertilizer composition of claim 1, wherein said fertilizer has an electrical conductivity between about 10 and about 100 mS·cm$^{-1}$ at 10% in water solution.

17. The liquid fertilizer composition of claim 1, said monoethanolamine molybdate being formed by adding monoethanolamine to molybdic acid in heated water.

18. The liquid fertilizer composition of claim 1, further comprising a nonionic surfactant.

19. A liquid fertilizer composition comprising:
a source of nickel;
a source of cobalt;
monoethanolamine molybdate;
an organic acid; and
from about 5% to about 55% by weight seaweed, based on the total weight of the liquid fertilizer composition taken as 100% by weight,
said liquid fertilizer composition having a solution pH of about 6.0 to 7.5.

20. The liquid fertilizer composition of claim 19, said monoethanolamine molybdate being formed by adding monoethanolamine to molybdic acid in heated water.

21. The liquid fertilizer composition of claim 19, said seaweed being present at levels of from about 20% to about 45% by weight, based on the total weight of the liquid fertilizer composition taken as 100% by weight.

* * * * *